US010822268B2

(12) United States Patent
Hurst et al.

(10) Patent No.: US 10,822,268 B2
(45) Date of Patent: Nov. 3, 2020

(54) SPLASH SCREEN

(71) Applicant: PILKINGTON GROUP LIMITED, Lathom (GB)

(72) Inventors: Simon James Hurst, Runcorn (GB); Anna Louise Colley, Prescot (GB); Peter Michael Harris, Chester (GB); Kieran James Cheetham, Bootle (GB)

(73) Assignee: Pilkington Group Limited, Lathom (GB)

( * ) Notice: Subject to any disclaimer, the term of this patent is extended or adjusted under 35 U.S.C. 154(b) by 0 days.

(21) Appl. No.: 15/569,110

(22) PCT Filed: Apr. 26, 2016

(86) PCT No.: PCT/GB2016/051170
§ 371 (c)(1),
(2) Date: Oct. 25, 2017

(87) PCT Pub. No.: WO2016/174411
PCT Pub. Date: Nov. 3, 2016

(65) Prior Publication Data
US 2018/0118613 A1    May 3, 2018

(30) Foreign Application Priority Data

Apr. 29, 2015 (GB) .................................. 1507330.7

(51) Int. Cl.
*B32B 15/04* (2006.01)
*B32B 17/06* (2006.01)
(Continued)

(52) U.S. Cl.
CPC .............. *C03C 17/245* (2013.01); *A47K 3/30* (2013.01); *C03B 18/14* (2013.01); *C03C 17/02* (2013.01);
(Continued)

(58) Field of Classification Search
USPC ................ 428/426, 428, 432, 701, 702, 688
See application file for complete search history.

(56) References Cited

U.S. PATENT DOCUMENTS 4,386,117 A      5/1983   Gordon
4,775,203 A  *  10/1988   Vakil ................... C03C 17/3417
                                                          427/255.7
(Continued)

FOREIGN PATENT DOCUMENTS

CN        101458355 A      6/2009
EP         0594171 A1      4/1994
(Continued)

OTHER PUBLICATIONS http://www.valleydesign.com/soda-lime-glass.htm, 2015.*
(Continued)

*Primary Examiner* — Lauren R Colgan
(74) *Attorney, Agent, or Firm* — Marshall & Melhorn, LLC (57) ABSTRACT

A splash screen, and a process for making a splash screen, comprising a glass sheet, the glass sheet comprising, a substrate of soda lime silica glass having a coating deposited on at least at least a first surface, the coating comprising a corrosion-protection layer deposited directly on the first surface of the substrate, the corrosion-protection layer having a thickness in the range 24 nm to 125 nm and comprising pyrolytically deposited silica with intentional doping of 7 atom % or lower. The splash screen provides reduced moisture induced corrosion of the glass surface.

28 Claims, 2 Drawing Sheets

(51) Int. Cl.
*C03C 17/245* (2006.01)
*C03C 17/34* (2006.01)
*C03C 17/02* (2006.01)
*C03C 17/42* (2006.01)
*A47K 3/30* (2006.01)
*C03B 18/14* (2006.01)
*C03C 17/25* (2006.01)
*C03C 23/00* (2006.01)

(52) U.S. Cl.
CPC .............. *C03C 17/25* (2013.01); *C03C 17/34* (2013.01); *C03C 17/3417* (2013.01); *C03C 17/42* (2013.01); *C03C 23/0075* (2013.01); *C03C 2217/213* (2013.01); *C03C 2217/24* (2013.01); *C03C 2217/78* (2013.01); *C03C 2218/11* (2013.01); *C03C 2218/152* (2013.01); *C03C 2218/365* (2013.01)

(56) References Cited

U.S. PATENT DOCUMENTS

| | | | |
|---|---|---|---|
| 5,089,039 A | 2/1992 | Terneu et al. | |
| 5,221,352 A * | 6/1993 | Terneu ................. | C03C 17/002 118/718 |
| 5,313,316 A * | 5/1994 | Davidge ................. | A47G 1/02 359/509 |
| 5,613,276 A * | 3/1997 | Franz ................. | A47K 3/36 16/229 |
| 5,623,955 A * | 4/1997 | Sewell ................. | A45D 27/29 132/291 |
| 5,709,930 A * | 1/1998 | DePauw ............ | C03C 17/3417 428/216 |
| 5,730,771 A | 3/1998 | Terneu et al. | |
| 5,798,142 A * | 8/1998 | Soubeyrand ............ | B32B 17/06 427/255.18 |
| 6,071,623 A | 6/2000 | Sugawara et al. | |
| 6,485,838 B1 * | 11/2002 | Shimada ................ | C03C 17/30 428/33 |
| 6,501,014 B1 * | 12/2002 | Kubota ................ | H01L 31/048 136/251 |
| 6,667,075 B2 * | 12/2003 | Kitazoe ................ | C03C 17/245 427/341 |
| 6,818,309 B1 * | 11/2004 | Talpaert ................ | C03C 17/22 428/432 |
| 6,916,542 B2 | 7/2005 | Buhay et al. | |
| 2002/0192365 A1 * | 12/2002 | Kitazoe ................ | C03C 17/245 427/162 |
| 2005/0119402 A1 * | 6/2005 | Suzuki ................ | C08J 7/12 524/588 |
| 2007/0099000 A1 * | 5/2007 | Hirano ................ | C03C 17/34 428/432 |
| 2008/0138611 A1 * | 6/2008 | Yasuzawa ................ | B05D 7/51 428/336 |
| 2008/0160187 A1 * | 7/2008 | Murata ................ | C03C 17/28 427/164 |
| 2008/0292800 A1 * | 11/2008 | Murayama ............... | B05D 5/04 427/385.5 |
| 2009/0050018 A1 * | 2/2009 | Kishimoto ............... | C09D 1/00 106/286.8 |
| 2012/0015196 A1 | 1/2012 | Wang et al. | |
| 2014/0234534 A1 * | 8/2014 | Fish ..................... | C09D 183/04 427/58 |
| 2018/0118613 A1 * | 5/2018 | Hurst ................... | C03C 17/02 |
| 2019/0135686 A1 * | 5/2019 | Hurst ................... | C03C 17/22 |

FOREIGN PATENT DOCUMENTS

| | | |
|---|---|---|
| EP | 2263980 A1 | 12/2010 |
| EP | 2559670 A1 | 2/2013 |
| EP | 2647606 A1 | 10/2013 |
| GB | 2334263 A | 8/1999 |
| JP | S5888144 A | 5/1983 |
| WO | 2013/003130 A2 | 1/2013 |

OTHER PUBLICATIONS https://www.youtube.com/watch?v=dd1J8BVaR9s, 2012.*
European Patent Office, The International Search Report and Written Opinion which issued in PCT/GB2016/051170, dated Jun. 14, 2016, 10 pages, European Patent Office, Rijswijk, Netherlands.

* cited by examiner

SPLASH SCREEN

The present invention relates to splash screens comprising glass substrates and to processes for making such splash screens. The invention also relates to the use of pyrolytically deposited silica layers for corrosion protection in splash screens.

BACKGROUND OF THE INVENTION

Coatings on glass are known in which the coating is intended to modify the properties of the glass substrate.

CN-A-101458355 relates to a display panel with a glass substrate having a coating layer of silica (next to the glass) and a layer of AlN on the silica layer.

EP-A-0 594 171 relates to a method of making glass hydrophilic using flame deposition with a silicon alkoxide precursor.

GB-A-2,334,263 relates to a hydrophilic article of a substrate and a two-layer coating with a first layer of a mixed oxide amorphous silica/metal oxide and a second layer of crystalline titania matrix and ultrafine particles of silica or alumina.

JP-A-55888144 relates to an inner silica film obtained by hydrosilicofluoric/boric acid treatment of an alkali containing glass with a subsequent metal or oxide film deposited on the silica film.

U.S. Pat. Nos. 5,798,142, 4,386,117 and 5,089,039 relate to deposition of silica or silica/tin oxide underlayers for colour suppression and alkali blocking in tin oxide containing coatings.

Splash screens, for example shower or bath screens or screens used in other moist or wet environments, are often made of glass, in particular soda lime silica glass. Unfortunately, splash screens made of glass tend to become increasingly difficult to clean with time and become dull and hazy in appearance. This results from the relatively harsh conditions to which glass is subject in a moist or wet environment. Aspects of typical environments where splash screens, especially shower or bath screens, are used, for example water, especially hard water, heat, humidity, soap scum and cleaning agents, can all cause spotting, discoloration and corrosion to the surface of the glass. Corrosion of glass leads to irreversible damage to the glass surface.

Glass corrosion happens in two stages. The first stage is aqueous corrosion, caused by water in contact with the glass surface and involves alkali ion leaching. The second stage involves attack under even relatively mild alkaline conditions leading to dissolution of the glass surface. Cleaning agents used to clean glass surfaces and detergents and soaps may be mildly or strongly alkaline.

There have been attempts to provide surface treatments and/or coatings on glass which reduce or prevent glass corrosion.

EP-A-2 647 606 relates to glass bath or shower screens intended to suffer from less limescale or corrosion by using silica coatings deposited by sputtering. The document discloses that doping of the silica by greater than 8 atom % is necessary to prevent corrosion of glass.

EP-A-2 559 670 discloses anti-corrosion coatings on glass made of alumina, titania, zirconia, or magnesium fluoride with controlled porosity.

EP-A-2 263 980 discloses a Zn dust containing surface treatment for glass.

U.S. Pat. No. 5,730,771 discloses a corrosion protection layer of pyrolytic mixed silica/titania deposited using a titanium chelate precursor.

WO-A-2013/003130 discloses a protective film (for e.g. a shower glass door) of a sacrificial film containing diamond like carbon (DLC) and Zn, $Al_xN_y$, ZnN or $ZrO_2$. The film is intended to undergo heat treatment before use.

US-A-2004/023080 discloses a protective coating over a functional coating, the protective coating is sputtered and has two layers of $Al_2O_3$ containing $SiO_2$ and $SiO_2$ containing $Al_2O_3$.

Other products or methods include surface treatments to render the surface hydrophobic with, for example, sol gel formulations of hybrid organic-inorganic precursors, modified silanes with sol gel additives, or modified silanes which chemically cross-link after surface treatment. Other products include reactive silicone fluids to coat the surface with an easy-to-clean polymeric coating or polymeric resins to provide a low maintenance, non-stick surface.

SUMMARY OF THE INVENTION

It is an aim of the present invention to address the problems with known products or methods and to produce a splash screen with no tendency or a reduced tendency to corrode.

In a first aspect, the present invention accordingly provides, a splash screen comprising a glass sheet, the glass sheet comprising, a substrate of soda lime silica glass having a coating deposited on at least the first surface, the coating comprising a corrosion-protection layer deposited directly on at least the first surface of the substrate, the corrosion-protection layer having a thickness in the range 24 nm to 125 nm and comprising pyrolytically deposited silica. Preferably, the pyrolytically deposited silica has intentional doping of 7 atom % or lower.

Surprisingly, such a coating is highly effective at reducing or preventing corrosion of a glass surface. It may also be almost as easy to clean as a float glass surface as indicated by cleaning-related friction tests. In combination with the enhanced corrosion resistance provided by the coating, it is a particularly effective solution to the corrosion/soiling problem.

Usually, the pyrolytically deposited silica has intentional doping of 5 atom % or lower, preferably 3 atom % or lower and more preferably with substantially no intentional doping.

Thus, preferably, the corrosion-protection layer comprises 93 mol % to 100 mol % silicon dioxide, more preferably 95 mol % to 100 mol % silicon dioxide and most preferably 97 mol % to 100 mol % silicon dioxide.

It has proven to be beneficial if the corrosion-protection layer has a thickness in the range 30 nm to 125 nm, preferably 34 nm to 120 nm, more preferably 37 nm to 120 nm, most preferably 45 nm to 120 nm. Still more preferably a thickness in the range 50 nm to 110 nm, preferably 55 nm to 101 nm, more preferably 55 nm to 99 nm, most preferably 55 nm to 79 nm. Thicknesses somewhat below 24 nm, preferably 30 nm appear to have less of a corrosion-protective effect. Thicknesses somewhat higher than 125 nm or 120 nm may affect the optical properties of the product and may be more difficult to deposit at a sufficiently high deposition rate. Deposition rate is especially important if the pyrolytically deposited layer is deposited online during the float glass production process or otherwise wherein the coating apparatus and substrate are moving relative to each other. Thicknesses greater than about 45 nm are particularly preferred because coatings of this thickness are (as shown by cleaning-related friction tests) almost as easy to wipe clean as uncoated float glass.

Surprisingly, it is advantageous if the outer layer (i.e. the layer of the coating in contact with the external environment, usually the atmosphere) of the coating comprises pyrolytically deposited silica, preferably with intentional doping of 7 atom % or lower. A silica outer layer which is in contact, in use, with the moist environment is advantageous because it may provide a relatively hydrophilic surface which tends to reduce problems with splash and splash-induced soiling of the surface.

The outer layer may be a layer that is a subsequently deposited layer. However, preferably the outer layer is the corrosion-protection layer.

Thus in one embodiment, the corrosion-protection layer may be the only layer of the coating.

In some embodiments, the splash screen may further comprise a further layer deposited on the corrosion-protection layer, the further layer comprising silica deposited from a liquid coating composition comprising a polysilazane.

Alternatively or additionally, the splash screen may further comprise a second corrosion-protection layer deposited on the second surface of the substrate, the second corrosion-protection layer comprising silica deposited from a liquid coating composition comprising a polysilazane.

The invention relates to a splash screen for use in moist or wet environments or otherwise subject to water splash. The splash screen finds particular use as a bath screen and/or a shower screen.

Usually, the splash screen of the invention will further comprising fixings to fix the splash screen in position for use. Such fixings may include hinge fixings. The fixings may be attached to the splash screen through adhesion (e.g. adhesives pads attached to at least one surface of the splash screen and to the fixings) and/or through mechanical attachment, (e.g. bolts) extending through or attached to holes in the splash screen. Such holes may be drilled holes.

The substrate may be adapted to hold fixings to fix the splash screen in position for use. The substrate may be adapted to hold fixings by having at least one hole (for example one hole, two holes, three holes, four holes or more than four holes) drilled through the substrate.

It is preferred, for reasons of safety that the substrate is toughened. If the substrate has at least one hole drilled through the substrate, the substrate may be toughened after the hole(s) are drilled.

The substrate is preferably edge-worked.

Surfaces that are rougher than uncoated float glass, as may be provided by splash screens according to the invention, may be advantageous because the rougher surface may improve adhesion of fixings using an adhesive.

Splash screens according to the invention use pyrolytically deposited layers of silica on glass.

Thus, the present invention accordingly provides, in a second aspect, a process for manufacturing a splash screen comprising a glass sheet, the process comprising providing a substrate of soda lime silica glass, pyrolytically depositing a corrosion-protection layer directly on a surface of the substrate, the corrosion-protection layer comprising silica and being deposited to a thickness in the range 24 nm to 125 nm. Preferably, the corrosion-protection layer is silica with intentional doping of 7 atom % or lower.

Usually, pyrolytically depositing the corrosion-protection layer comprises contacting the surface of the substrate with a precursor mixture comprising a source of silicon, a source of oxygen and optionally a radical scavenger.

The source of silicon may comprise an oxygenated silicon compound for example a silicon alkoxide (e.g. tetraethylorthosilicate, TEOS), and/or a silicon halide (e.g. silicon chloride). Preferably, however, the source of silicon comprises a silane, more preferably monosilane, $SiH_4$.

The source of oxygen may comprise a compound containing oxygen, for example a ketone (e.g. acetone), an ester (e.g. ethyl acetate), or an alcohol (e.g. a $C_1$ to $C_4$ alcohol, such as methanol, ethanol, propanol or butanol). However, usually, the source of oxygen comprises oxygen gas.

Preferably (especially if the source of silicon is reactive, for example, monosilane), the precursor mixture comprises a radical scavenger. A radical scavenger is advantageous because it enables reactive silicon sources (e.g. monosilane which may be pyrophoric) to be premixed with oxygen gas without undergoing ignition and premature reaction at the operating temperatures used in the coater. The radical scavenger further provides control of, and permits optimization of, the kinetics of the chemical vapour deposition (CVD) reaction on the glass surface.

The radical scavenger may comprise an alkene, preferably a $C_2$ to $C_6$ alkene, more preferably ethylene.

Usually, the substrate temperature will be in the range 300° C. to 800° C., preferably 400° C. to 750° C., more preferably 450° C. to 750° C. Most preferably, pyrolytically depositing the corrosion-protection layer may be conducted when the substrate is at a temperature in the range 550° C. to 750° C. If the temperature is too low the reaction rate, and thus deposition rate, may be too low or silica formation may be incomplete. If the temperature is too high the glass surface may be unstable as a substrate for deposition of good quality films.

The precursor mixture may be a fluid mixture. If the precursor mixture is a liquid, the deposition process may be spray deposition.

Preferably, however, the precursor mixture is a vapour or gas. Thus, preferably pyrolytically depositing the corrosion-protection layer is by chemical vapour deposition.

It is most preferred if pyrolytically depositing the corrosion-protection layer is by online chemical vapour deposition conducted during the float glass production process.

In a preferred embodiment, the process is chemical vapour deposition using a gaseous precursor mixture. Preferably, the precursor mixture comprises monosilane, oxygen, optionally water vapour and ethylene (as radical scavenger). In preferred embodiments of the process, the ratio of oxygen to silane compound (by flow rate) in the precursor mixture is 4:1 or higher, preferably 5:1 or higher and more preferably about 6:1.

As discussed, above, the process may be carried out in conjunction with the manufacture of the glass substrate in the well-known float glass manufacturing process.

As discussed above in relation to the first aspect, it may be advantageous to provide a process further comprising providing a liquid coating composition comprising a polysilazane, contacting the first and/or second surface of the substrate with the coating composition, and curing the coating composition at a predetermined curing temperature thereby forming a further layer comprising silica on the first and/or the second surface.

Thus, in a third aspect the present invention provides, a process for manufacturing a splash screen, the process comprising, providing a soda lime silica glass substrate having a first and second surface, and a coating deposited on at least a first surface, the coating comprising a corrosion-protection layer deposited directly on the first surface of the substrate, the corrosion-protection layer having a thickness in the range 24 nm to 125 nm and comprising pyrolytically deposited silica with intentional doping of 7 atom % or lower, providing a liquid coating composition comprising a polysilazane, contacting the first and/or second surface of the substrate with the coating composition, and curing the coating composition at a predetermined curing temperature, thereby forming a further layer comprising silica on the first and/or the second surface.

Preferably, the liquid coating composition comprises a solvent, preferably an aprotic solvent, more preferably dialkyl ether.

The polysilazane may be a compound of formula $[R^1R^2Si-NR^3]_n$, wherein $R^1$, $R^2$, and $R^3$ are each independently selected from H or $C_1$ to $C_4$ alkyl, and n is an integer. n may be such that the polysilazane has a number average molecular weight in the range 150 to 150,000 g/mol. The preferred polysilazane comprises perhydropolysilazane.

Usually, contacting the first and/or second surface with the coating composition comprises a method selected from dip coating, spin coating, roller coating, spray coating, air atomisation spraying, ultrasonic spraying, and/or slot-die coating.

It is preferred that the process further comprises cleaning the first and/or second surface before contacting the surface with the coating composition. Cleaning the first and/or second surface may comprise one or more of: abrasion with ceria, washing with alkaline aqueous solution, deionised water rinse and/or plasma treatment.

The predetermined curing temperature may be below 90° C., for example room temperature (e.g. about 20° C.) to 90° C. or even at around room temperature. Often, however, curing the coating composition on the surface of the substrate comprises heating so that the silica layer fully cures in a relatively short time. This will usually involve heating to a predetermined curing temperature of 90° C. or higher, more preferably 130° C. or higher. The usual predetermined curing temperature is in the range 90° C. to 650° C., preferably 130° C. to 650° C., more preferably 150° C. to 550° C., even more preferably 200° C. to 520° C., yet more preferably 250° C. to 450° C., most preferably 250° C. to 350° C.

The curing time usually depends upon the predetermined curing temperature. A high predetermined curing temperature requires relative shorter curing time, and a low predetermined curing temperature requires a relatively longer curing time. Generally, curing time may be 2 hours or below even at about 90° C. or 130° C.

Curing the coating composition on the surface of the substrate may additionally or alternatively comprise irradiating with ultraviolet (UV) radiation, usually UV C radiation, in particular of a wavelength of 100 nm to 280 nm or below (e.g. around 208 nm) for 1 second to several minutes, more often from 1 s to 60 s. If curing is by UV irradiation it may not be necessary to heat the substrate, and the predetermined curing temperature may be around room temperature (e.g. about 20° C.).

The concentration of polysilazane in the coating composition may be adjusted to an appropriate level. Using a coating composition of relatively high concentration may be used to deposit a relatively thick layer comprising silica. Thus, the polysilazane may be at a concentration in the range 0.5% to 80% by weight in the coating composition, preferably in the range 0.5% to 20% by weight, more preferably in the range 0.5% to 10% by weight, most preferably in the range 1% to 5% by weight.

The process may be controlled (for example by adjusting the concentration, volume applied, number of applications, and/or time of application of the coating composition) to vary the thickness of the deposited further layer comprising silica. Thus, the further silica layer may be deposited to a thickness of 15 nm or higher, preferably 20 nm or higher, more preferably 25 nm or higher and most preferably 75 nm or higher. The silica layer will usually have a thickness in the range 15 nm to 5 µm, preferably 20 nm to 2.5 µm, more preferably 25 nm to 700 nm and most preferably 75 nm to 650 nm. The further silica layer will usually have a refractive index in the range 1.42 to 1.55, preferably 1.45 to 1.54, more preferably 1.48 to 1.53.

Splash screens according to the invention are greatly advantageous because of their improved corrosion resistance especially in moist and warm environments.

Thus, in fourth aspect, the present invention provides use of a pyrolytically deposited silica layer with intentional doping of 7 atom % or lower and a thickness in the range 24 nm to 125 nm on a surface of soda lime silica glass substrate as a corrosion protection layer for use in a splash screen.

BRIEF DESCRIPTION OF THE DRAWINGS

The present invention will now be described by way of example only, and with reference to, the accompanying drawings, in which.

DETAILED DESCRIPTION OF THE INVENTION

Figure 1:
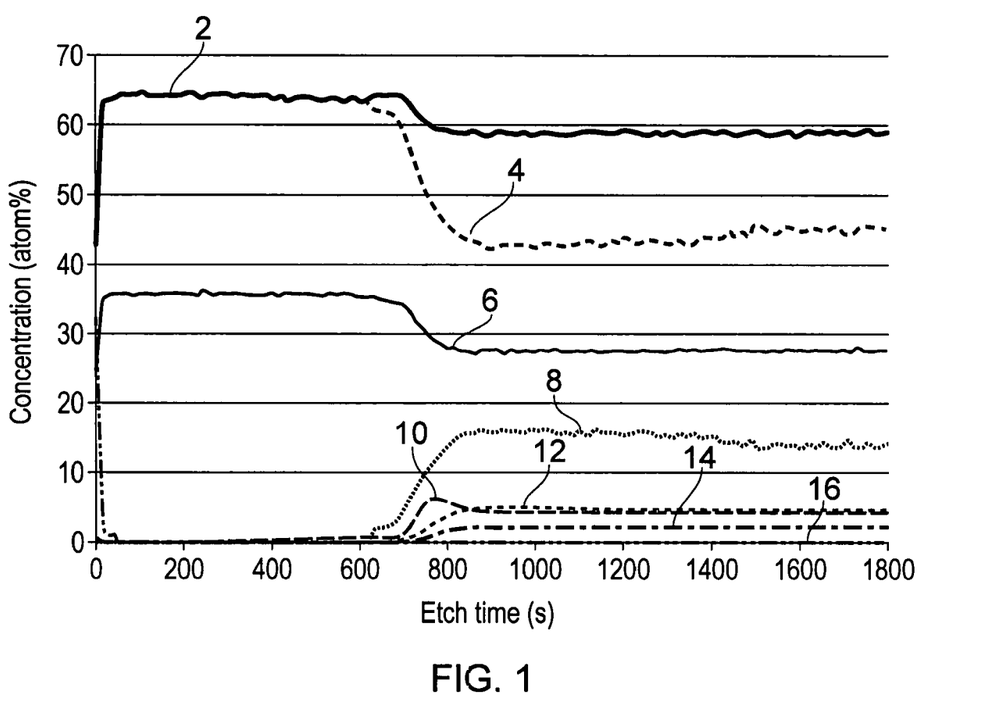
FIG. 1 is a graph showing X-Ray Photo-Electron Spectroscopy (XPS) depth profile results for Example 1.

FIG. 1 shows the results of XPS of Example 1. The curves are as follows: 2, O1s scan A; 4, O1s total; 6, Si2p; 8, O1s scan B; 10, Na1s; 12, Ca2p3/2; 14, Mg1s; and 16, C1s.

Figure 2:
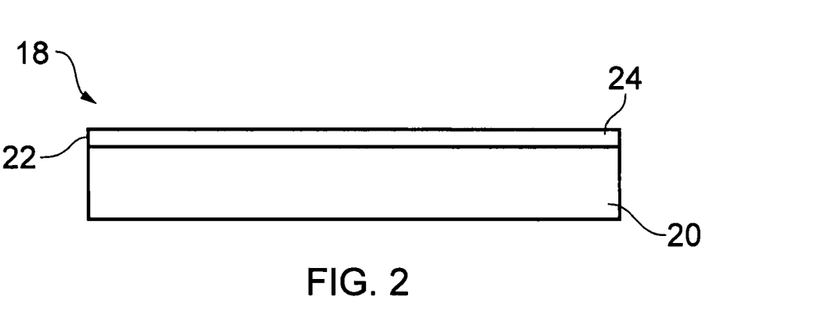
FIG. 2 illustrates schematically a splash screen according to an embodiment of the present invention.

FIG. 2 illustrates schematically a splash screen 18 comprising a soda lime silica glass substrate 20 having a coating 22 on a surface. The coating comprises a single layer. The single layer is a corrosion-protection layer 24 deposited directly on the substrate surface. The corrosion protection layer is of silica 69 nm thick (as determined by SEM) with no intentional doping.

The invention is further illustrated, but not limited, by the following examples.

Examples

Preparation of Example and Comparative Examples

Example 1 is a 10 mm thick glass sheet having (on the air side surface) a pyrolytic coating of silica deposited by online chemical vapour deposition. The coating was deposited on a ribbon of the soda lime silica glass during the float glass production process. The conditions for deposition were as follows: a gaseous precursor mixture (in nitrogen carrier gas) of silane, oxygen gas and ethylene (as radical scavenger) in a ratio of 1:6:4 respectively (flow rates of 6 standard litres per minute (slm) silane, 36 slm oxygen, 24 slm ethylene) was directed on to the surface of a glass ribbon across its whole coated width of about 3.2 m using a single coater. The temperature of the glass ribbon at the region of coating was approximately 1251-1254° F. (677° C. to 679° C.). The line speed was 229 inch/minute (5.8 m/min). The coating was determined to be of a thickness of approximately 69 nm by scanning electron microscopy (see below).

Example 2 was a float glass sample having on a surface a pyrolytic silica coating of thickness 35 nm deposited generally as indicated for Example 1.

Example 3 was a float glass sample having on a surface a pyrolytic silica coating of thickness 25 nm deposited generally as indicated for Example 1.

XPS Results

X-ray photoelectron spectroscopy (XPS) was used to provide depth profile analysis of Example 1. XPS spectra were carried out through the coating to identify the elements present. An argon ion etch beam was operated at 1 keV (M) producing a beam current of 1.68 µA. A 15 second etch time per level was used. The results are shown in FIG. 1. The depth profiles from Example 1 confirmed the presence of a silica layer on the glass surface. Sodium was only detected in the bottom half of the silica layer.

Scanning Electron Microscopy

Figure 3A:
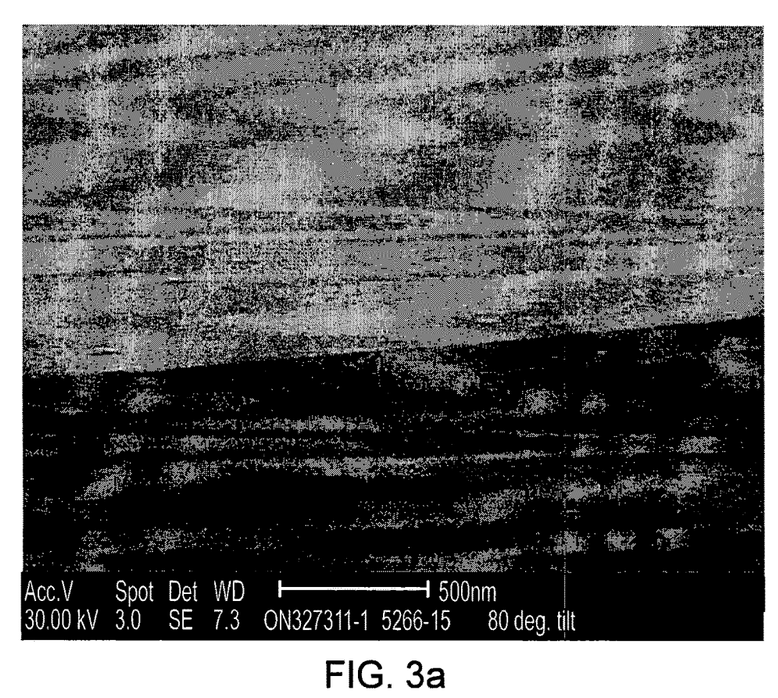
FIG. 3a is a scanning electron micrograph of Example 1 at 80° sample tilt and 50,000 magnification.
Figure 3B:
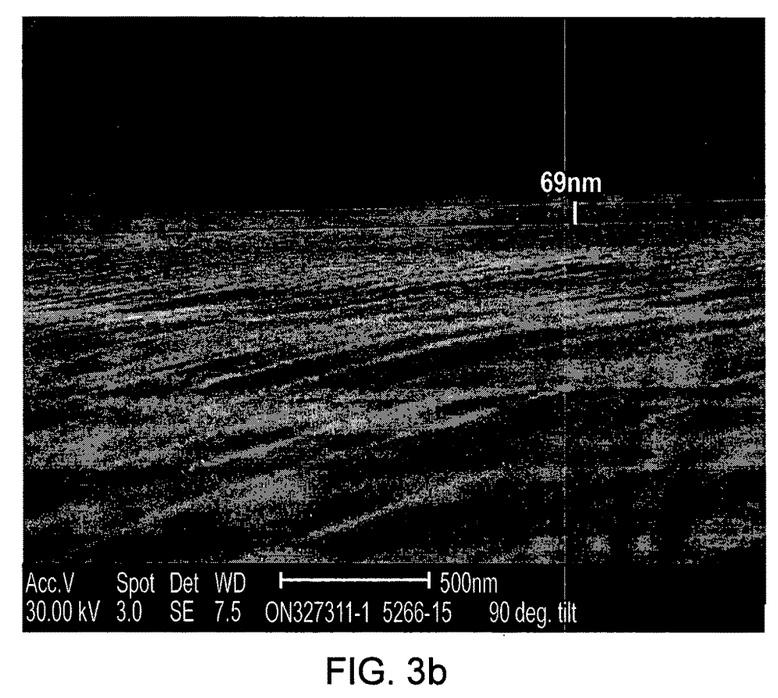
FIG. 3b is a scanning electron micrograph of Example 1 at 90° sample tilt and 50,000 magnification.

Example 1 was imaged using scanning electron microscopy (SEM). Images of the specimens were captured at an instrument magnification of ×50,000 using both 80° (FIG. 3a) and 90° (FIG. 3b) specimen tilt. Specimens were taken from the sample, mounted on to aluminium stubs in cross section and ultrasonically cleaned in methanol for 10 seconds. The cleaned specimens were coated with a thin layer of platinum (providing a uniform conductive surface) prior to examination using the SEM.

The 80° tilt images of the specimen from Example 1 (FIG. 3a) showed an amorphous coating layer with a smooth surface; there were a few small particles at the surface.

Measurements taken from the 90° tilt images of Example 1 (FIG. 3b) showed that the silica layer was approximately 69 nm thick.

Optical Measurements

The a* and b* colours and reflection of Example 1 were determined. The results are as indicated in Table 1 together with comparative results for the substrate: float glass. The coating of the Example has little effect on the colour of the sample, but there is a slight reduction in reflection. This is an advantageous property of embodiments of splash screens according to the present invention.

Friction Test

A friction test was conducted on samples to provide an indication as to how easily a surface could be wiped clean. The friction test was conducted on cleaned samples (Benteler washing machine) of the Examples and on float glass (as a comparative) and involved placing a felt covered weight of 320 g on the sample and slowly increasing the angle of inclination of the sample until the weight starts to slide down the sample. The angle of inclination was recorded and is indicated in Table 2, below.

Durability and Artificial Weathering

The following durability and artificial weathering tests were conducted to evaluate Example 1 and the Comparative (uncoated float glass). The test were as follows: condensation, salt spray, Taber test area fraction remaining (%), Taber—days of humidity before weathering, NaOH (1M) durability before weathering, post NaOH test—days of humidity before weathering, HCl (1M) durability, post HCl test—days of humidity before weathering, post acid cleaner dip—days of humidity before weathering, post alkali cleaner dip—days of humidity before weathering, humidity only (days) before weathering, and cleaning test. The condensation, salt spray and humidity tests were used in order to indicate the resistance of a coating to humidity in order to try and replicate the environment of a bathroom. The standard test time for EN1096 testing is 21 days (504 hours). This test was run for 1000 hours to get a further understanding of the durability of the coatings.

The chemical durability tests involved submerging the test sample into 1 M NaOH solution held at 70° C. for 25 minutes. A further test involved samples being submerged in a common household cleaner at room temperature for 64 hours to assess if there was any coating damage.

The results of the environmental (weathering), chemical and humidity testing are as indicated in Tables 3, 4 and 5.

TABLE 1

| Sample | FS Color a* | FS Color b* | FS Reflect (%) |
|---|---|---|---|
| Comparative (Float Glass) | −1.35 | −0.61 | 7.81 |
| Example 1 | −1.38 | −0.18 | 7.57 |

TABLE 2

| Sample | Coating thickness (nm) | Friction Value (Angle of glass) Coated (air) side | Friction Value (Angle of glass) Uncoated (tin) side |
|---|---|---|---|
| Comparative (10 mm thick float glass) | Uncoated | 34 (uncoated) | 28 |
| Example 1 | 69 | 39 | 28 |
| Example 2 | 35 | 49 | 36 |
| Example 3 | 25 | 51 | 30 |

TABLE 3

| | Environmental Tests | | | |
|---|---|---|---|---|
| Sample | Condensation (according to EN 1096) | Salt Spray (according to EN 1096) | Taber Test Area Fraction Remaining (%) | Taber - Days of humidity before weathering |
| Comparative (Float Glass) | Fail | Pass | 97.63 | 8 |
| Example 1 | Pass | Pass | 98.56 | 56 |
| Example 2 | Pass | Pass | N/A | N/A |
| Example 3 | Pass | Pass | N/A | N/A |

TABLE 4

| | Chemical Tests | | | |
|---|---|---|---|---|
| Sample | NaOH (1M) Durability before weathering | Post NaOH Test - days of humidity before weathering | HCl (1M) Durability | Post HCl Test - days of humidity before weathering |
| Comparative (Float Glass) | Pass | 9 | Pass | 24 |
| Example 1 | Pass | 109 | Pass | 109 |

TABLE 5

| | Cleaning and Humidity Tests | | | |
|---|---|---|---|---|
| Sample | Post Acid Cleaner dip - days of humidity before weathering | Post Alkali Cleaner dip - days of humidity before weathering | Humidity only (days) before weathering | Cleaning Test |
| Comparative (Float Glass) | 8 | 8 | 6 | Pass |
| Example 1 | 120+ | 120+ | 76+ | Pass |

The invention claimed is:

1. A splash screen comprising a glass sheet, the glass sheet comprising:
    a substrate of soda lime silica glass having a coating deposited on at least a first surface,
    the coating comprising a corrosion-protection layer deposited directly on the first surface of the substrate, the corrosion-protection layer having a thickness in the range 24 nm to 125 nm and comprising pyrolytically deposited silica with intentional doping of 7 atom % or lower,
    further comprising a second corrosion-protection layer deposited on the second surface of the substrate, the second corrosion-protection layer comprising silica deposited from a liquid coating composition comprising a polysilazane; and
    wherein the splash screen is a bath screen and/or a shower screen and wherein the glass substrate with corrosion-protection layer passes standard EN1096.

2. The splash screen as claimed in claim 1, wherein the pyrolytically deposited silica has intentional doping of 5 atom % or lower.

3. The splash screen as claimed in claim 1, wherein the pyrolytically deposited silica has intentional doping of 3 atom % or lower.

4. The splash screen as claimed in claim 1, wherein the corrosion-protection layer comprises 93 mol % to 100 mol % silicon dioxide.

5. The splash screen as claimed in claim 1, wherein the corrosion-protection layer has a thickness in the range 30 nm to 120 nm.

6. The splash screen as claimed in claim 1, wherein the corrosion-protection layer has a thickness in the range 50 nm to 110 nm.

7. The splash screen as claimed in claim 1, wherein the outer layer of the coating comprises pyrolytically deposited silica with intentional doping of 7 atom % or lower.

8. The splash screen as claimed in claim 1, wherein the outer layer of the coating comprises the corrosion-protection layer.

9. The splash screen as claimed in claim 1, wherein the corrosion-protection layer is the only layer of the coating on the first surface.

10. The splash screen as claimed in claim 1, further comprising a further layer deposited on the corrosion-protection layer, the further layer comprising silica deposited from a liquid coating composition comprising a polysilazane.

11. The splash screen as claimed in claim 1, wherein the substrate is adapted to hold fixings to fix the splash screen in position for use.

12. The splash screen as claimed in claim 11, wherein the substrate is adapted to hold fixings by having at least one hole drilled through the substrate.

13. The splash screen as claimed in claim 1, wherein the substrate is toughened.

14. The splash screen as claimed in claim 1, further comprising fixings to fix the splash screen in position for use, and wherein the fixings comprise adhesive portions or mechanical attachment portions to attach the fixings to the splash screen.

15. A process for manufacturing a splash screen comprising a glass sheet, the process comprising:
    providing a substrate of soda lime silica glass, pyrolytically depositing a corrosion-protection layer directly on a first surface of the substrate, the corrosion-protection layer comprising silica with intentional doping of 7 atom % or lower and being deposited to a thickness in the range 24 nm to 125 nm,
    further providing a liquid coating composition comprising a polysilazane, contacting the second surface of the substrate with the coating composition, and
    curing the coating composition at a predetermined curing temperature thereby forming a further layer comprising silica on the second surface, and
    wherein the splash screen is a bath screen and/or a shower screen and wherein the glass substrate with corrosion-protection layer passes standard EN1096.

16. The process as claimed in claim 15, wherein pyrolytically depositing the corrosion-protection layer comprises contacting the surface of the substrate with a precursor mixture comprising a source of silicon, a source of oxygen and, optionally, a radical scavenger.

17. The process as claimed in claim 15, wherein the source of silicon comprises a silane.

18. The process as claimed in claim 15, wherein the radical scavenger comprises an alkene and wherein pyrolytically depositing the corrosion-protection layer is conducted when the substrate is at a temperature in the range 550° C. to 750° C.

19. The process as claimed in claim 15, wherein pyrolytically depositing the corrosion-protection layer is by online chemical vapour deposition conducted during the float glass production process.

20. The process as claimed in claim 15, wherein the liquid coating composition comprises a solvent and wherein the polysilazane is a compound of formula $[R^1R^2Si-NR^3]_n$, wherein one of $R^1$, $R^2$, and $R^3$ are each independently selected from H or $C_1$ to $C_4$ alkyl, and n is an integer.

21. The process as claimed in claim 15, wherein the polysilazane comprises perhydropolysilazane.

22. The process as claimed in claim 15, wherein contacting the second surface with the coating composition comprises a method selected from dip coating, spin coating, roller coating, spray coating, air atomisation spraying, ultrasonic spraying, and/or slot-die coating.

23. The process as claimed in claim 22, further comprising cleaning the first and/or second surface before contacting the surface with the coating composition, and wherein cleaning the second surface comprises one or more of: abrasion with ceria, washing with alkaline aqueous solution, deionised water rinse and/or plasma treatment.

24. The process as claimed in claim 15, wherein the predetermined curing temperature is a temperature of 130° C., and wherein curing the coating composition on the surface of the substrate comprises irradiating with ultraviolet (UV) radiation.

25. The process as claimed in claim 15, wherein the polysilazane is at a concentration in the range 0.5% to 80% by weight in the coating composition.

26. The process as claimed in claim 15, wherein the further silica layer is deposited to a thickness of 15 nm or higher.

27. The process as claimed in claim 15, wherein the further layer of silica layer has a refractive index in the range 1.42 to 1.55.

28. The process for manufacturing a splash screen, the process comprising,
- providing a soda lime silica glass substrate having a first and second surface, and a coating deposited on at least a first surface, the coating comprising a corrosion-protection layer deposited directly on the first surface of the substrate, the corrosion-protection layer having a thickness in the range 24 nm to 125 nm and comprising pyrolytically deposited silica with intentional doping of 7 atom % or lower,
- providing a liquid coating composition comprising a polysilazane,
- contacting the second surface of the substrate with the coating composition, and
- curing the coating composition at a predetermined curing temperature, thereby forming a further layer comprising silica on the second surface, wherein the splash screen is a bath screen and/or a shower screen and wherein the glass substrate with corrosion-protection layer passes standard EN1096.

* * * * *

UNITED STATES PATENT AND TRADEMARK OFFICE
CERTIFICATE OF CORRECTION

PATENT NO. : 10,822,268 B2
APPLICATION NO. : 15/569110
DATED : November 3, 2020
INVENTOR(S) : Simon James Hurst et al.

Page 1 of 1

It is certified that error appears in the above-identified patent and that said Letters Patent is hereby corrected as shown below:

In the Claims

Claim 23, Column 10, Line 55, delete "first and/or"

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*